(12) United States Patent
Kimura (10) Patent No.: US 10,110,773 B2
(45) Date of Patent: Oct. 23, 2018

(54) IMAGE FORMING APPARATUS

(71) Applicant: KYOCERA Document Solutions Inc., Osaka-shi, Osaka (JP)

(72) Inventor: Atsushi Kimura, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/497,980

(22) Filed: Apr. 26, 2017

(65) Prior Publication Data

US 2017/0318185 A1 Nov. 2, 2017

(30) Foreign Application Priority Data

Apr. 27, 2016 (JP) ................. 2016-089880

(51) Int. Cl.
*H04N 1/04* (2006.01)
*H04N 1/32* (2006.01)

(52) U.S. Cl.
CPC ..... *H04N 1/32651* (2013.01); *H04N 1/32641* (2013.01); *H04N 2201/0094* (2013.01); *H04N 2201/3202* (2013.01)

(58) Field of Classification Search
CPC ........... H04N 1/32651; H04N 1/32641; H04N 2201/0094; H04N 2201/3202

USPC ........................................................ 358/1.14
See application file for complete search history.

(56) References Cited

U.S. PATENT DOCUMENTS

| 5,644,405 A | 7/1997 | Sato | |
| 2008/0178268 A1* | 7/2008 | Kodaira | G06F 21/62 |
| | | | 726/4 |
| 2009/0201544 A1* | 8/2009 | Kumakura | H04N 1/32122 |
| | | | 358/1.15 |
| 2017/0230529 A1* | 8/2017 | Tachi | H04N 1/00204 |

FOREIGN PATENT DOCUMENTS

JP 2004201335 A 7/2004

* cited by examiner

*Primary Examiner* — Houshang Safaipour
(74) *Attorney, Agent, or Firm* — Alleman Hall Creasman & Tuttle LLP (57) ABSTRACT

A selection processing portion is configured to select, as one or a plurality of events to be reported, one or a plurality of candidate events, in accordance with user operation, from among the preset plurality of candidate events. A count processing portion is configured to individually count a frequency of occurrences of each of the events to be reported. An output processing portion is configured to cause, when a count result by the count processing portion has met a preset condition, printing on a sheet and outputting of a report that includes an occurrence history of at least one of the events to be reported.

4 Claims, 5 Drawing Sheets

| REPORT AUTOMATIC OUTPUT SETTING | | |
|---|---|---|
| CANDIDATE EVENT | TO BE REPORTED | UPPER LIMIT EVENT FREQUENCY |
| ALL FACSIMILE TRANSMISSIONS AND RECEPTIONS | NO | — |
| SUCCESSFUL FACSIMILE TRANSMISSION | NO | — |
| FAILED FASCIMILE TRANSMISSION | YES | 25 |
| SUCCESSFUL FACSIMILE RECEPTION | NO | — |
| FAILED FASCIMILE RECEPTION | YES | 25 |
| RETRANSMISSION TO FAILED DESTINATION | YES | 5 |

| CANDIDATE EVENT | TO BE REPORTED | UPPER LIMIT EVENT FREQUENCY | CURRENT EVENT FREQUENCY |
|---|---|---|---|
| ALL FACSIMILE TRANSMISSIONS AND RECEPTIONS | NO | — | — |
| SUCCESSFUL FACSIMILE TRANSMISSION | NO | — | — |
| FAILED FASCIMILE TRANSMISSION | YES | 25 | 3 |
| SUCCESSFUL FACSIMILE RECEPTION | NO | — | — |
| FAILED FASCIMILE RECEPTION | YES | 25 | 1 |
| RETRANSMISSION TO FAILED DESTINATION | YES | 5 | 0 |

REPORT AUTOMATIC OUTPUT SETTING

| CANDIDATE EVENT | TO BE REPORTED |
|---|---|
| ALL FACSIMILE TRANSMISSIONS AND RECEPTIONS | NO |
| SUCCESSFUL FACSIMILE TRANSMISSION | NO |
| FAILED FASCIMILE TRANSMISSION | YES |
| SUCCESSFUL FACSIMILE RECEPTION | NO |
| FAILED FASCIMILE RECEPTION | YES |
| RETRANSMISSION TO FAILED DESTINATION | YES |

UPPER LIMIT EVENT FREQUENCY (TOTAL): 50    OK

FIG. 7

REPORT AUTOMATIC OUTPUT SETTING

| CANDIDATE EVENT | TO BE REPORTED | WEIGHT |
|---|---|---|
| ALL FACSIMILE TRANSMISSIONS AND RECEPTIONS | NO | – |
| SUCCESSFUL FACSIMILE TRANSMISSION | YES | 1 |
| FAILED FASCIMILE TRANSMISSION | YES | 2 |
| SUCCESSFUL FACSIMILE RECEPTION | YES | 1 |
| FAILED FASCIMILE RECEPTION | YES | 2 |
| RETRANSMISSION TO FAILED DESTINATION | YES | 10 |

UPPER LIMIT VALUE (TOTAL): 50    OK

IMAGE FORMING APPARATUS

INCORPORATION BY REFERENCE

This application is based upon and claims the benefit of priority from the corresponding Japanese Patent Application No. 2016-089880 filed on Apr. 27, 2016, the entire contents of which are incorporated herein by reference.

BACKGROUND

The present disclosure relates to an image forming apparatus that is capable of printing a report indicating a history of event occurrences on a sheet and outputting the sheet.

There is known a multifunction facsimile device that has a report output function of recording and outputting an administration report necessary for device administration and that is capable of automatically outputting the administration report at a predetermined time.

SUMMARY

An image forming apparatus according to one aspect of the present disclosure includes a selection processing portion, a count processing portion, and an output processing portion. The selection processing portion is configured to select, as one or a plurality of events to be reported, one or a plurality of candidate events, in accordance with user operation, from among the preset plurality of candidate events that include one or a plurality of a successful facsimile transmission process, a failed facsimile transmission process, a successful facsimile reception process, and a failed facsimile reception process, together with a facsimile transmission to a destination to which a facsimile transmission had failed in the past. The count processing portion is configured to individually count a frequency of occurrences of each of the events to be reported. The output processing portion is configured to cause, when a count result by the count processing portion has met a preset condition, printing on a sheet and outputting of a report that includes an occurrence history of at least one of the events to be reported.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described in detail based on the accompanying drawings in order to allow understanding of the present disclosure. It should be noted that the following embodiment is an example embodying the present disclosure and does not limit the technical scope of the present disclosure.

[Configuration of Image Forming Apparatus]

Figure 1:
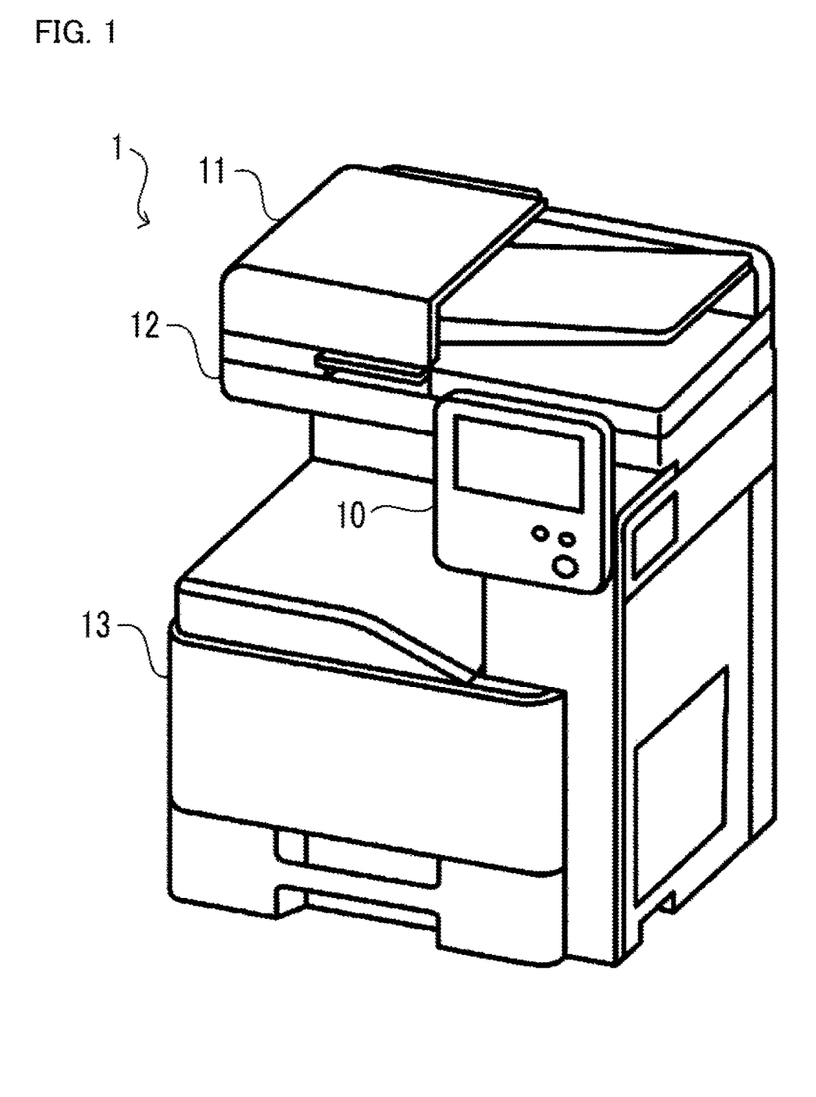
FIG. 1 is a view illustrating an external appearance of an image forming apparatus according to an embodiment of the present disclosure.
Figure 2:
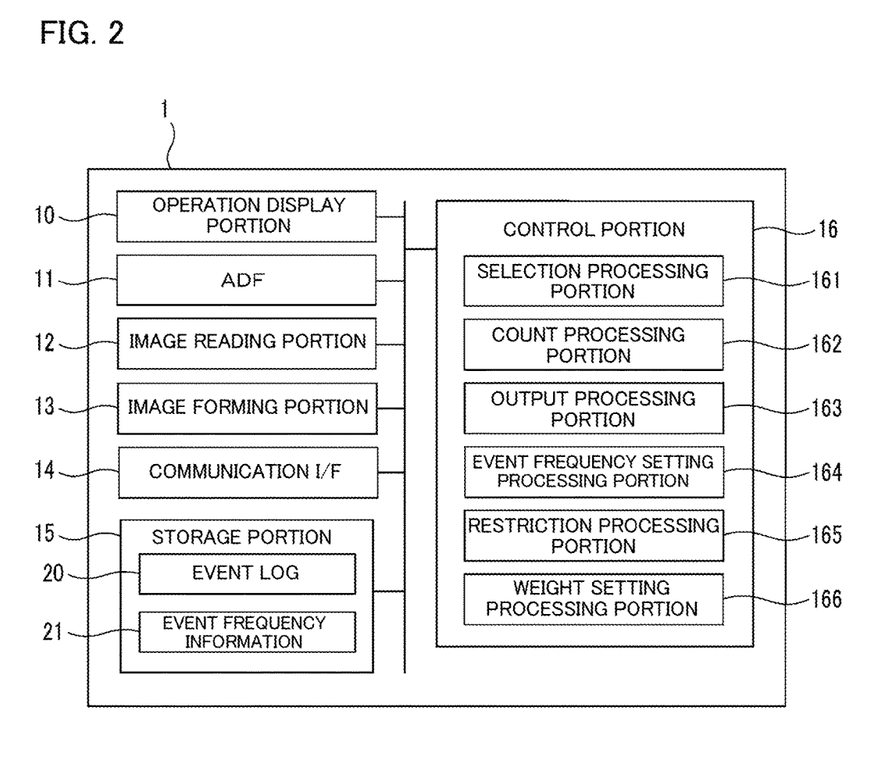
FIG. 2 is a block diagram illustrating a system configuration of the image forming apparatus according to the embodiment of the present disclosure.

As shown in FIGS. 1 and 2, an image forming apparatus 1 according to an embodiment of the present disclosure includes an operation display portion 10, an Auto Document Feeder (ADF) 11, an image reading portion 12, an image forming portion 13, a communication I/F 14, a storage portion 15, a control portion 16, and the like. Specifically, the image forming apparatus 1 is a multifunction peripheral having a printer function, a scanner function, a copy function, a facsimile function, and the like. The present disclosure is applicable to not only a multifunction peripheral but also any image forming apparatus that is capable of printing, on a sheet, a report indicating a history of event occurrences regarding facsimile communication (administration report) and outputting the administration report.

The operation display portion 10 includes a display portion such as a liquid crystal display which displays information, and an operation portion such as a touch panel and operation buttons which receives user operation.

The ADF 11 includes a document set portion, conveyance rollers, a document holder, and a sheet discharge portion, and is an automatic document feeder that conveys a document to be read by the image reading portion 12.

The image reading portion 12 includes a document table, a light source, mirrors, an optical lens, and a Charge Coupled Device (CCD), and is capable of reading an image of a document and outputting the image as image data.

The image forming portion 13 is capable of performing a printing process on the basis of image data by using an electrophotography method or an inkjet method, and forms an image on a sheet on the basis of the image data. For example, when the image forming portion 13 is an image forming portion that uses an electrophotography method, the image forming portion 13 includes a photosensitive drum, a charging device, an exposure device, a developing device, a transfer device, a fixing device, and the like.

The communication I/F 14 is a communication interface capable of performing a communication process in accordance with a predetermined communication protocol with an external information processing apparatus such as a facsimile apparatus or a personal computer, via a communication network such as a telephone line, the Internet, or a LAN.

Figure 4:
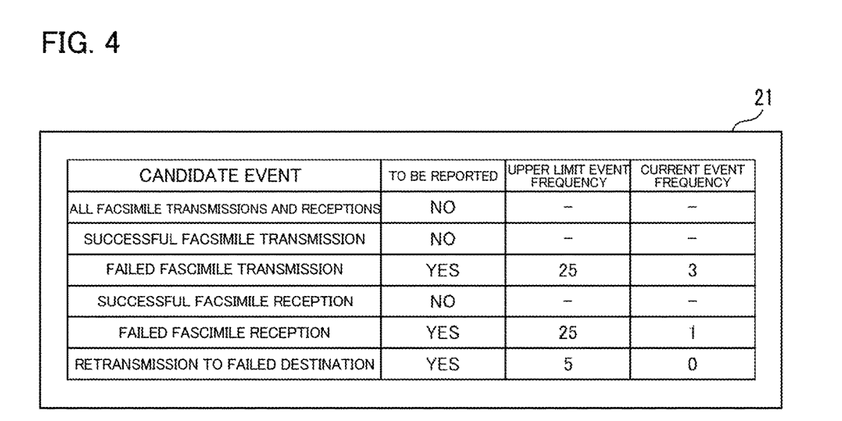
FIG. 4 is a diagram illustrating an example of event frequency information used in the image forming apparatus according to the embodiment of the present disclosure.

The storage portion 15 is a non-volatile storage portion such as a hard disk, or EEPROM (registered trademark). The storage portion 15 stores various control programs to be executed by the control portion 16, various types of data, and the like. For example, the storage portion 15 stores an event log 20 and event frequency information 21 (FIG. 4).

The control portion 16 includes control devices such as a CPU, a ROM, and a RAM. The CPU is a processor that executes various kinds of operational processing. The ROM is a non-volatile storage portion in which information such as a control program for causing the CPU to execute the various kinds of processing is previously stored. The RAM is a volatile or non-volatile storage portion used as a temporary storage memory (working area) for the various kinds of processing executed by the CPU.

Specifically, the control portion 16 includes a selection processing portion 161, a count processing portion 162, an output processing portion 163, an event frequency setting processing portion 164, a restriction processing portion 165, and a weight setting processing portion 166. The control portion 16 functions as the processing portions by executing various processes in accordance with the control program. In addition, the control portion 16 may include an electronic circuit that realizes a part or a plurality of process functions of each processing portion.

The selection processing portion 161 selects one or a plurality of preset candidate events from among a plurality of predetermined candidate events as an event to be reported in accordance with user operation. For example, the selection processing portion 161 selects in a setting screen 30 shown in FIG. 3 a candidate event for which a "to be reported" column is set to "YES" by the user, as the event to be reported.

The plurality of candidate events may include any event. For example, the plurality of candidate events may include one or a plurality of a successful facsimile transmission process, a failed facsimile transmission process, a successful facsimile reception process, and a failed facsimile reception process. The plurality of candidate events may, for example, include a facsimile transmission to a destination to which a facsimile transmission had failed in the past.

The count processing portion 162 individually counts the frequency of occurrences of the event to be reported. For example, every time the event to be reported occurs, the count processing portion 162 counts up the current event frequency that corresponds to the event to be reported in the event frequency information 21 stored in the storage portion 15.

When a count result by the count processing portion 162 has met a preset condition, the output processing portion 163 causes printing on a sheet and outputting of a report that includes an occurrence history of at least one of the events to be reported (administration report).

The event frequency setting processing portion 164 sets an upper limit event frequency for each event to be reported in accordance with user operation. For example, the event frequency setting processing portion 164 sets a numeric value inputted by the user into an "upper limit event frequency" column in the setting screen 30 shown in FIG. 3 as the upper limit event frequency for each event to be reported. In this case, when the frequency of occurrences of any one of the events to be reported has reached the upper limit event frequency that corresponds to the event to be reported, the output processing portion 163 causes outputting of the report that includes the occurrence history of the event to be reported.

When the total frequency of occurrences of the events to be reported has reached a preset upper limit event frequency, the output processing portion 163 may cause outputting of the report. For example, when the total frequency of occurrences of a candidate event (that is, the event to be reported) in which the "to be reported" column is set to "YES" by the user in a setting screen 40 shown in FIG. 6 has reached the upper limit event frequency (for example, 50 events) designated by the user in the setting screen 40 shown in FIG. 6, the output processing portion 163 causes outputting of the report that includes the occurrence history of these events.

The weight setting processing portion 166 sets a weight for each event to be reported in accordance with user operation. For example, the weight setting processing portion 166 sets a numeric value inputted by the user into a "weight" column in a setting screen 50 shown in FIG. 7, as a weight for each event to be reported. In this case, when the total value of results obtained by multiplying the frequency of occurrences of each event to be reported by the weight for each event to be reported has reached a preset upper limit value, the output processing portion 163 causes outputting of the report. For example, when the total value of results obtained by multiplying the frequency of occurrences of each event to be reported by the weight for each event to be reported has reached an upper limit value (for example, 50) designated by the user in the setting screen 50 shown in FIG. 7, the output processing portion 163 causes outputting of the report that includes the occurrence history of these events.

When a count result by the count processing portion 162 has met a preset condition, the restriction processing portion 165 restricts the operation of the image forming apparatus 1. For example, when the event frequency of a facsimile transmission to a destination to which a facsimile transmission had failed in the past (that is, "retransmission to a failed destination" in FIG. 3) has reached an upper limit event frequency (for example, 5 events) designated by the user in the setting screen 30 shown in FIG. 3, the restriction processing portion 165 restricts the operation of the image forming apparatus 1. In this case, the restriction processing portion 165 may, for example, prohibit both a facsimile transmission and a facsimile reception, may prohibit only the facsimile transmission, or may prohibit only the facsimile transmission to the destination.

When causing printing of the report on the sheet and outputting of the report, the output processing portion 163 is capable of causing printing of a serial number on the sheet and outputting of the report. Accordingly, even when the sheet on which the report had been printed has been taken away or destroyed by a person other than the administrator, the administrator can recognize this event easily.

Incidentally, there is known a multifunction facsimile device that has a report output function to record and output an administration report necessary for device administration and that is capable of automatically outputting an administration report at a predetermined time. However, the above automatically outputted administration report may include information unnecessary for the administrator. On the other hand, in the image forming apparatus 1 according to the present embodiment, as described above, since the event to be reported is selected from among preset candidate events in accordance with user operation, the user can automatically output only necessary events from the preset candidate events. Therefore, the image forming apparatus 1 of the present embodiment can output a report efficiently.

[Operation of Image Forming Apparatus]

Next, the operation of the image forming apparatus 1 will be described with reference to FIGS. 3 to 7.

The image forming apparatus 1 of the present embodiment includes three output modes, from a first output mode to a third output mode, as an output mode for automatically outputting a report. The user (administrator) of the image forming apparatus 1 is allowed to select a desired output mode from among the three of output modes. Hereinafter, the operation of the image forming apparatus 1 in each output mode will be described.

[First Output Mode]

First, the first output mode will be described. The first output mode is an output mode in which a report is individually outputted for each event to be reported.

Figure 3:
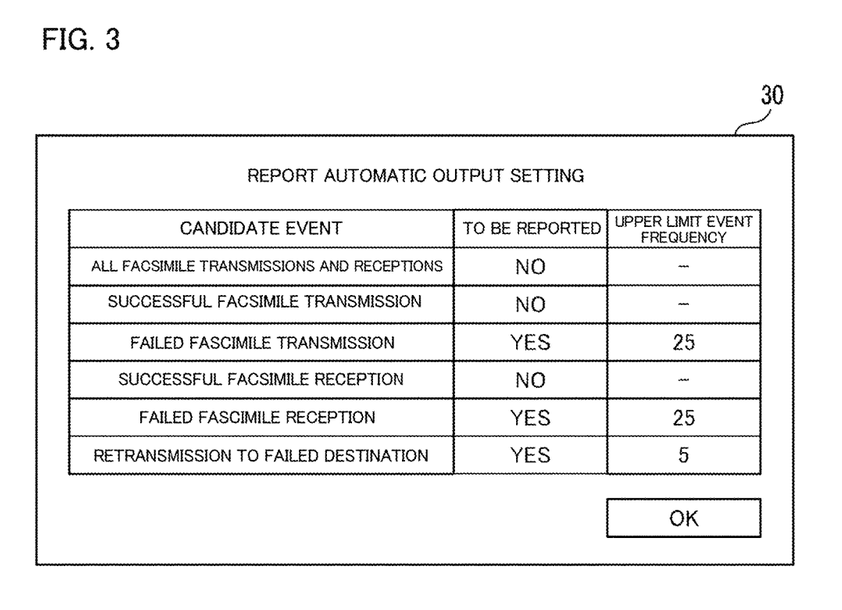
FIG. 3 is a diagram illustrating an example of a setting screen used in the image forming apparatus according to the embodiment of the present disclosure.

When the first output mode is selected by the user, the setting screen 30 shown in FIG. 3 is displayed on the operation display portion 10. In the setting screen 30, the user can designate, for each of the plurality of preset candidate events, the upper limit event frequency and whether or not the candidate event should be set to be the event to be reported. For example, as in "retransmission to a failed destination" in FIG. 3, when a facsimile transmission to a destination to which a facsimile transmission had failed in the past is repeated many times, there arises a suspicion of misdemeanor. Therefore, the upper limit event frequency of such an event is preferably set to a small value.

The information set through the setting screen 30 is, for example, stored in the storage portion 15 as a part of the event frequency information 21 shown in FIG. 4. In the event frequency information 21, the current event frequency is stored for each event to be reported. The current event frequency indicates the frequency of occurrences of each event to be reported.

Figure 5:
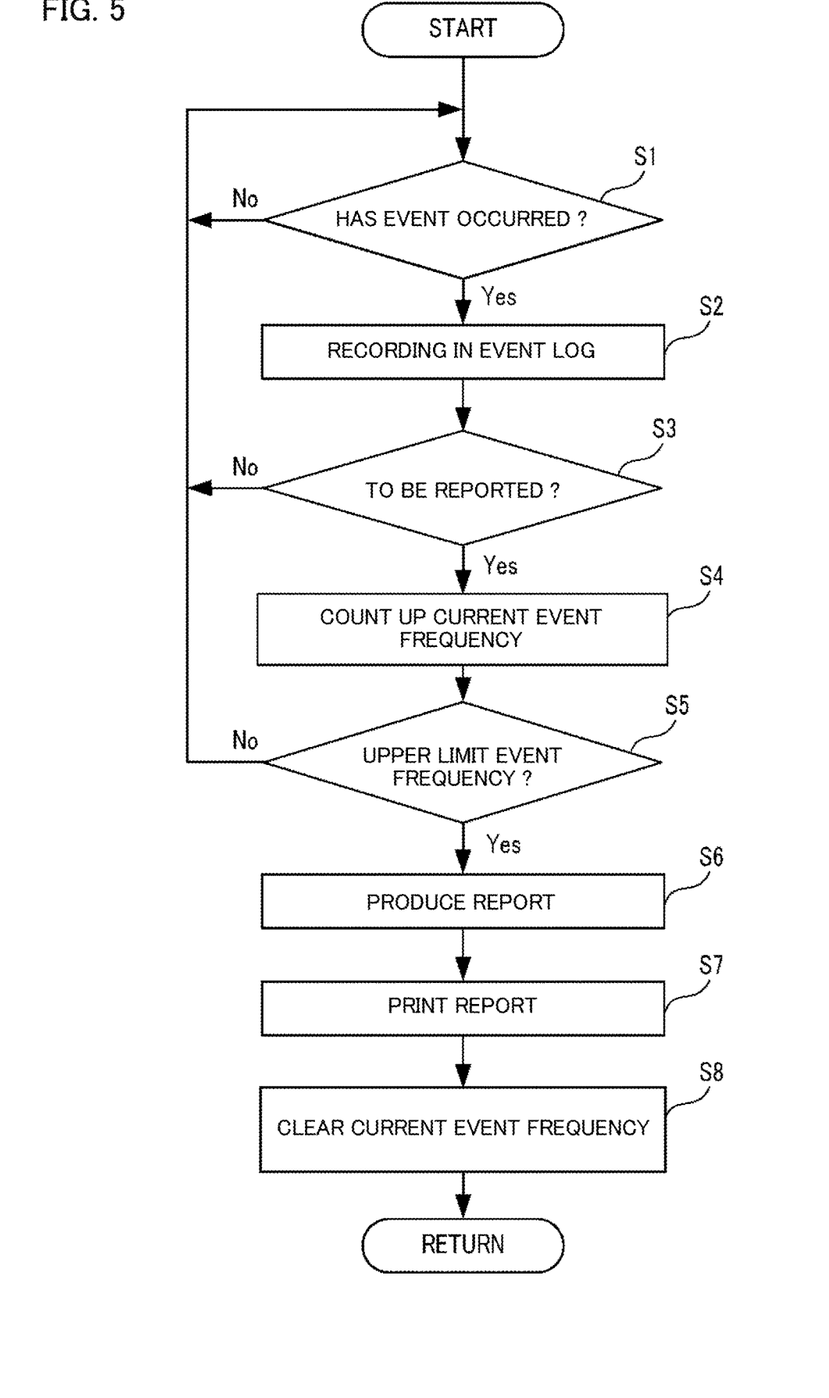
FIG. 5 is a flowchart illustrating an example of a procedure of a report output processing performed in the image forming apparatus according to the embodiment of the present disclosure.

Next, with reference to FIG. 5, an example of a procedure of the report output processing performed by the control portion 16 in the first output mode will be described. Here, step S1, S2, and so on represent numbers of the process procedures (steps) performed by the control portion 16. The report output processing starts, for example, when the image forming apparatus 1 has been turned on, and the report output processing ends when the image forming apparatus 1 has been turned off.

<Step S1>

First, in step S1, the control portion 16 determines whether or not an event to be recorded in the event log 20 has occurred. When it is determined that the event has occurred (S1: Yes), the processing moves to step S2. Meanwhile, when it is determined that the event has not occurred (S1: No), the process in step S1 is repeated until it is determined that the event has occurred.

<Step S2>

In step S2, the control portion 16 records information regarding the occurred event in the event log 20. The information recorded in the event log 20 includes, for example, job numbers, job types (facsimile transmission, facsimile reception, email transmission, email reception, and the like), results (normal termination, cancellation, error, and the like), destinations, reception time, termination time, page numbers, and the like.

<Step S3>

In step S3, the control portion 16 determines whether or not the occurred event is the event to be reported. For example, when the "to be reported" column that corresponds to the event in the event frequency information 21 is "YES", the control portion 16 determines that the event is the event to be reported. When it is determined that the event is the event to be reported (S3: Yes), the processing moves to step S4. Meanwhile, when it is determined that the event is not the event to be reported (S3: No), the processing returns to step S1.

<Step S4>

In step S4, the control portion 16 counts up (totals) the "current event frequency" that corresponds to the event to be reported in the event frequency information 21.

<Step S5>

In step S5, the control portion 16 determines whether or not the frequency of occurrences of the event to be reported has reached the upper limit event frequency. For example, when the value of the "current event frequency" that corresponds to the event to be reported in the event frequency information 21 has reached the "upper limit event frequency" that corresponds to the event to be reported in the event frequency information 21, the control portion 16 determines that the frequency of occurrences of the event to be reported has reached the upper limit event frequency. When it is determined that the frequency of occurrences of the event to be reported has reached the upper limit event frequency (S5: Yes), the processing moves to step S6. Meanwhile, when it is determined that the frequency of occurrences of the event to be reported has not reached the upper limit event frequency (S5: No), the processing returns to step S1.

<Step S6>

In step S6, the control portion 16 produces a report that includes an occurrence history of the event to be reported. For example, the control portion 16 produces the report by extracting the upper limit number of most recent events to be processed among the occurrence history of the event to be processed that are recorded in the event log 20.

<Step S7>

In step S7, the control portion 16 causes the image forming portion 13 to print on a sheet and output the report produced in step S6.

<Step S8>

In step S8, the control portion 16 clears the value of the "current event frequency" that corresponds to the event to be reported in the event frequency information 21 (for example, reset to "0"). Then, the processing returns to step S1.

The processes in steps S4 and S8 are performed by the count processing portion 162 of the control portion 16. The process in step S7 is performed by the output processing portion 163 of the control portion 16.

In the first output mode, the output processing portion 163 may cause printing, on the sheet, of a serial number independent set for each event to be reported and outputting of a report, and may cause printing of a serial number on the sheet independently of the event to be reported and outputting of a report.

As described above, in the first output mode, a report is individually outputted for each event to be reported. Therefore, the user can store a report for each event to be reported.

[Second Output Mode]

Next, a second output mode will be described. The second output mode is an output mode in which the occurrence histories of a plurality of events to be reported are outputted as a single report. In the second output mode, when the total frequency of occurrences of the events to be reported has reached a preset upper limit event frequency, the report is outputted.

Figure 6:
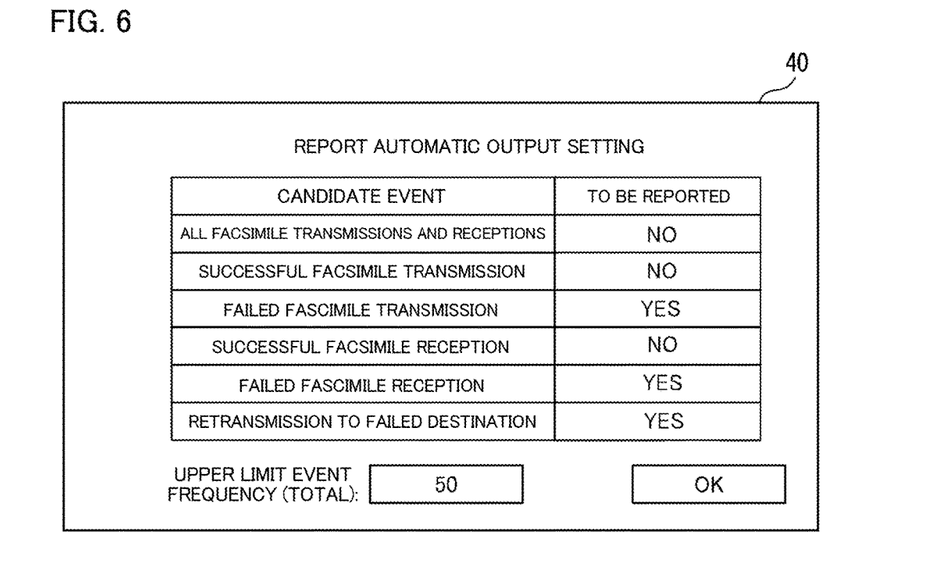
FIG. 6 is a diagram illustrating an example of the setting screen used in the image forming apparatus according to the embodiment of the present disclosure.

When the second output mode is selected by the user, the setting screen 40 shown in FIG. 6 is displayed on the operation display portion 10. In the setting screen 40, the user can designate whether or not each of the preset plurality of candidate events is the event to be reported. In the setting screen 40, the user can designate the upper limit event frequency.

In the second output mode, when any of the events to be reported occurs, as in the first output mode, the "current event frequency" that corresponds to the event in the event frequency information 21 is counted up. Then, the control portion 16 calculates, as the total event frequency, the sum of the "current event frequencies" of the events to be reported in the event frequency information 21. In the second output mode, the event frequency information 21 does not include the information of the "upper limit event frequency" for each event.

When the total event frequency has reached the upper limit event frequency (for example, 50 events) designated by the user in the setting screen 40 shown in FIG. 6, the control portion 16 produces a report that includes the occurrence history of the event to be reported. For example, the control portion 16 produces the report by extracting the upper limit number of most recent events to be reported among the occurrence history of the events to be reported that are recorded in the event log 20. The produced report is printed on a sheet and outputted.

As described above, in the second output mode, when the total frequency of occurrences of the events selected in advance by the user has reached the previously designated upper limit event frequency, the report that includes the occurrence history of these events is outputted. Accordingly, the second output mode is suitable in a case where a report in which the occurrence histories of a plurality of events are listed in a chronological order needs to be outputted.

[Third Output Mode]

Next, a third output mode will be described. The third output mode is an output mode in which as in the second output mode, the occurrence histories of a plurality of events to be reported are outputted as a single report. In the third output mode, when the total value of results obtained by multiplying the frequency of occurrences of each event to be reported by the weight set for each event to be reported has reached the preset upper limit value (for example, "50"), the report is outputted.

Figure 7:
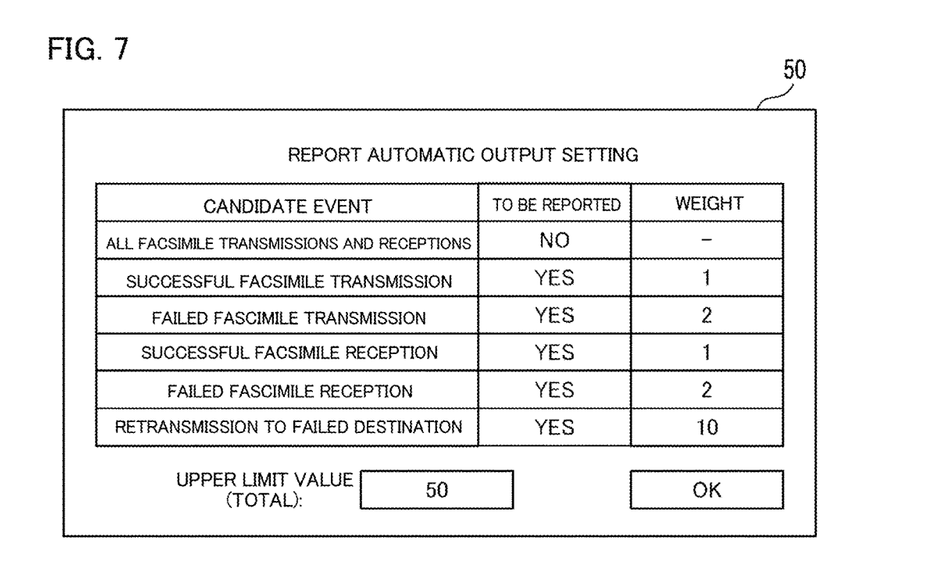
FIG. 7 is a diagram illustrating an example of the setting screen used in the image forming apparatus according to the embodiment of the present disclosure.

When the third output mode is selected by the user, the setting screen 50 shown in FIG. 7 is displayed on the operation display portion 10. In the setting screen 50, the user can designate, for each of the preset plurality of candidate events, a weight and whether or not to be set as the event to be reported. In the setting screen 40, the user can designate the upper limit value. The user can designate any value, for example, in a range from 1 to the upper limit value as a weight for each event to be reported.

In the third output mode, when any of the events to be reported occurs, as in the first output mode, the "current event frequency" that corresponds to the event in the event frequency information 21 is counted up. Then, the control portion 16 calculates, as a total value, the sum of results obtained by multiplying the "current event frequency" for each event to be reported in the event frequency information 21 by the weight for each event to be reported. In the third output mode, the event frequency information 21 does not include the information of "the upper limit event frequency" for each event. In the third output mode, the event frequency information 21 includes the information of the "weight" for each event.

When the total value has reached the upper limit value (for example, 50 events) designated by the user in the setting screen 50 shown in FIG. 7, the control portion 16 produces a report that includes the occurrence history of the event to be reported. For example, the control portion 16 produces the report by extracting a predetermined number of most recent events to be reported among the occurrence history of the events to be reported that are recorded in the event log 20 (that is, the total event frequency of the "current event frequencies" of the respective events to be reported that are recorded in the event frequency information 21). The produced report is printed and outputted.

As described above, in the third output mode, when the total value of results obtained by multiplying, by the weight, the frequency of occurrences of the event selected in advance by the user has reached the previously designated upper limit value, the report that includes the occurrence history of the event is outputted. Accordingly, as in the second output mode, the third output mode is suitable in a case where a report in which the occurrence histories of a plurality of events are listed in a chronological order needs to be outputted. By designating a greater weight for the event that is more important for the user, it becomes easier to output the report regarding the important event even if the event frequency is low. Therefore, the user can more quickly recognize the occurrence of the important event.

In the third output mode, when the total value of results, obtained by multiplying, by the weight, the frequency of occurrences of the event to be reported that is selected in advance by the user, has reached a preset threshold that is smaller than the upper limit value (one example of a display threshold of the present disclosure), the control portion 16 (one example of the display processing portion of the present disclosure) may display the report that includes the occurrence history of the event on the operation display portion 10 (one example of the display portion of the present disclosure). Accordingly, the user can more quickly recognize the occurrence of an important event without consuming the sheet.

[Modification]

In the above embodiment, the report is printed on a sheet. However, in another embodiment, the report may be transmitted via facsimile or email to the administrator when the report is not printed on a sheet, or yet again the report may be transmitted via facsimile or email to the administrator when the report is printed on a sheet.

In the above embodiment, the report is automatically printed when a predetermined condition has been met. However, in another embodiment, after the predetermined condition has been met, the report may be printed in accordance with a predetermined operation performed on the operation display portion 10, for example.

In the first output mode of the above embodiment, when the frequency of occurrences of each event to be reported has reached the upper limit event frequency after the previous report was outputted, a new report is outputted. In another embodiment, when the frequency of occurrences of the event within a preset time period until the current time has reached the preset event frequency, a new report may be outputted. For example, the event of "retransmission to a failed destination" in FIG. 3 has occurred five times or more during the last one hour, the report that corresponds to the event may be outputted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
  a processor configured to execute:
    a selection processing portion configured to select, as one or a plurality of events to be reported, one or a plurality of candidate events, in accordance with user operation, from among the preset plurality of candidate events that include one or a plurality of a successful facsimile transmission process, a failed facsimile transmission process, a successful facsimile reception process, and a failed facsimile reception process, together with a facsimile transmission to a destination to which a facsimile transmission had failed in the past;

a count processing portion configured to individually count a frequency of occurrences of each of the events to be reported;

a weight setting processing portion configured to set a weight for each of the events to be reported in accordance with user operation; and an output processing portion configured to cause, when a count result by the count processing portion has met a preset condition, printing on a sheet and outputting of a report that includes an occurrence history of at least one of the events to be reported, wherein the output processing portion causes outputting of the report when a total value of results obtained by multiplying the frequency of occurrences of each of the events to be reported by the weight for the event has reached a preset upper limit value.

2. The image forming apparatus according to claim 1, wherein the processor is further configured to execute a display processing portion configured to, when the total value has reached a preset display threshold that is smaller than the upper limit value, display the report on a display portion.

3. The image forming apparatus according to claim 1, wherein the processor is further configured to execute a restriction processing portion configured to, when the count result by the count processing portion has met the preset condition, restrict an operation of the image forming apparatus.

4. The image forming apparatus according to claim 1, wherein the output processing portion cause printing of a serial number on the sheet and outputting of the report.

* * * * *